United States Patent [19]

Norris et al.

[11] 4,002,012
[45] Jan. 11, 1977

[54] METHOD AND APPARATUS FOR SPLICING THERMOPLASTIC TEXTILE YARN

[75] Inventors: Alan H. Norris; Phillip W. Chambley, both of Rome, Ga.

[73] Assignee: Champion International Corporation, Stamford, Conn.

[22] Filed: May 21, 1975

[21] Appl. No.: 579,442

[52] U.S. Cl. .................................. 57/22; 57/34 B; 57/142; 57/157 F; 156/73.2; 156/73.5; 156/158
[51] Int. Cl.² ........................................ D01H 15/00
[58] Field of Search .............................. 57/22–23, 57/34 B, 142, 157 F, 156; 156/73.2, 73.5, 158

[56] References Cited
UNITED STATES PATENTS

| | | | |
|---|---|---|---|
| 3,184,354 | 5/1965 | Strother | 156/158 X |
| 3,273,330 | 9/1966 | Gonsalues | 57/142 |
| 3,306,020 | 2/1967 | Rosenstein | 57/142 |
| 3,334,477 | 8/1967 | Morin et al. | 57/22 |
| 3,407,583 | 10/1968 | Irwin et al. | 57/22 |
| 3,570,236 | 3/1971 | Arguelles | 57/142 |

Primary Examiner—Donald O. Woodiel
Assistant Examiner—Charles Gorenstein
Attorney, Agent, or Firm—Evelyn M. Sommer

[57] ABSTRACT

Thermoplastic yarn ends are spliced by overlapping side-by-side and spinning with an air jet circumferentially around a longitudinal axis of a cylindrical cavity with sufficient initial slack to insure engagement with the wall of said cavity. Heat is generated by the spinning action and concentrated in high twist nodal points giving rise to plasticization of the yarn and bonding of adjacent fibers. The spinning device has gripping elements for securing the yarn ends and introducing the necessary predetermined slack.

8 Claims, 12 Drawing Figures

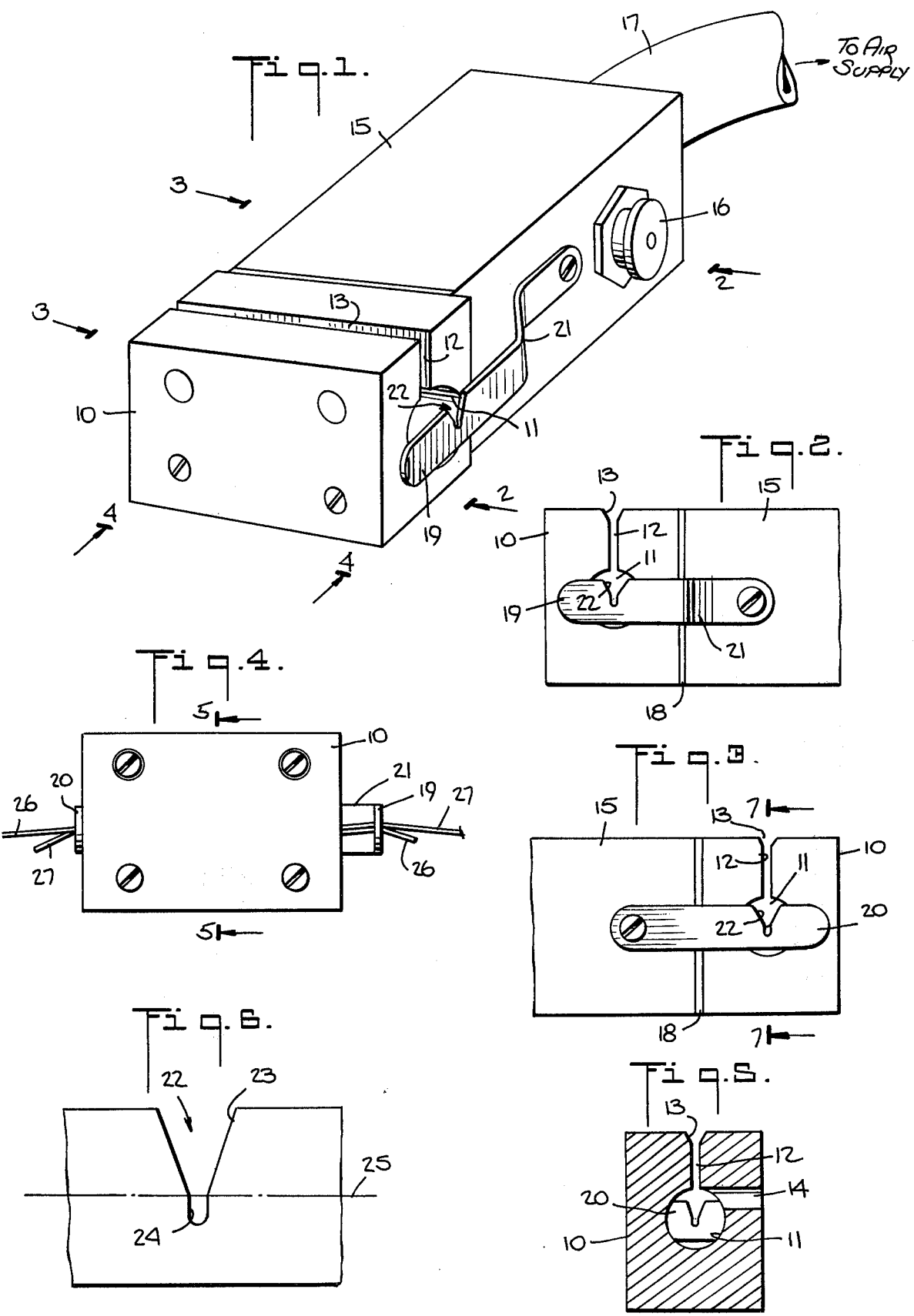

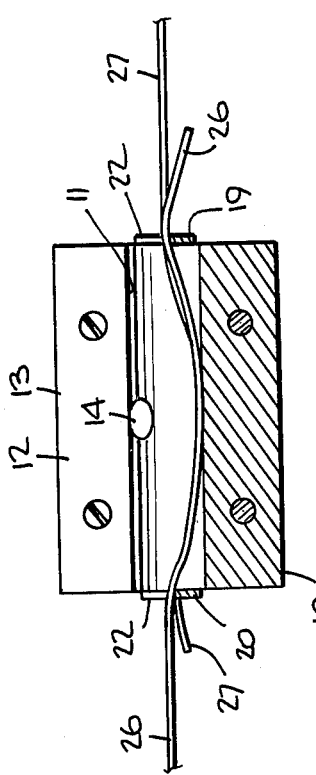
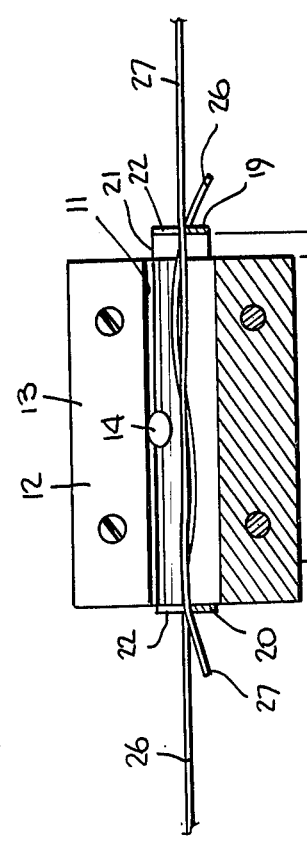
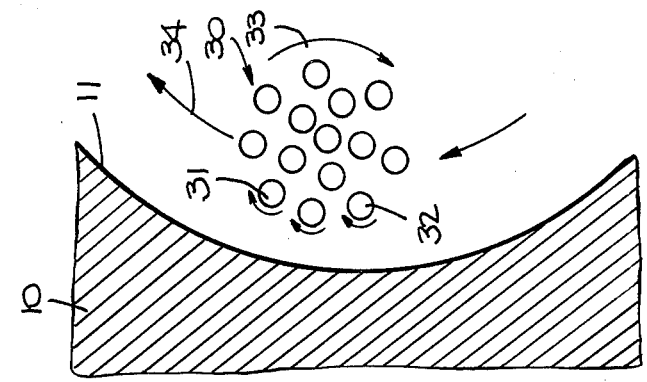
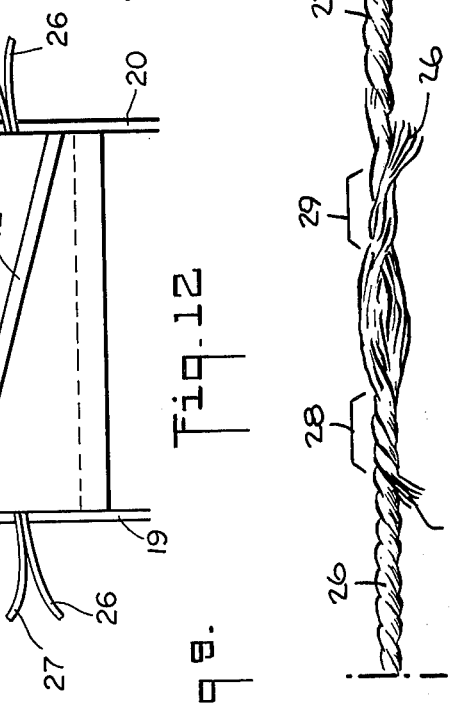
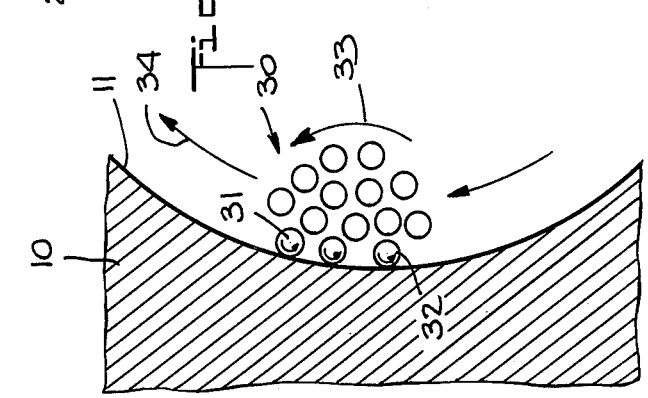

METHOD AND APPARATUS FOR SPLICING THERMOPLASTIC TEXTILE YARN

The present invention relates to a method and apparatus for splicing thermoplastic yarn.

In U.S. Pat. No. 3,474,615, issued Oct. 28, 1969, to M. F. Irwin et al., entitled "Splicing of Textile Strands", there is disclosed an air operated splicing device for textile strands. Said patented device consists of an air operated spray gun arranged to inject an adhesive along with an air jet tangentially into a tubular chamber which is open at both ends. Overlapping strands to be spliced are placed within the chamber between stationary guides at opposite ends thereof and swirled into an interengaged structure along with the application of the adhesive material thereto.

It has been discovered that by modifying suitably the device described in said patent it is possible to achieve strong splices between thermoplastic yarns without using adhesive material. The advantages arising from elimination of the adhesive should be self-evident.

It is, therefore, an object of the present invention to provide a method of splicing thermoplastic yarn by air spinning without the necessity of adding adhesives or plasticizers or other bond inducing or promoting material thereto.

In accordance with one aspect of the present invention, there is provided a method of splicing thermoplastic yarn which comprises the steps of placing in side-by-side overlapping relationship the yarn ends which are to be spliced. Thereafter disposing the overlapping yarn ends within a cylindrical cavity of a splicing device with the yarn secured at opposite ends of said cavity substantially at the longitudinal axis thereof and with sufficient slack within said cavity to insure initially engagement of said yarn therein with the wall of said cavity when said yarn is spun circumferentially around said axis, and circumferentially spinning said yarn within said cavity for a time sufficient to cause, and thereby causing, thermal bonding of adjacent yarn fibers.

In accordance with a further aspect of the invention, there is provided apparatus for carrying out the foregoing method which comprises a body with a cylindrical cavity therethrough, means for gripping overlapping yarn ends in side-by-side relationship at opposite ends of said cavity substantially at the longitudinal axis thereof, said gripping means being arranged to introduce a predetermined amount of slack in the yarn therebetween, and means for circumferentially spinning said yarn in the span between said gripping means.

The invention will be better understood after reading the following detailed description of the presently preferred embodiments thereof with reference to the appended drawings in which:

FIG. 1 is a perspective view of yarn splicing apparatus constructed in accordance with the subject invention;

FIG. 2 is a fragmentary side elevational view of the structure of FIG. 1 as viewed in the direction of the arrows from line 2—2 therein;

FIG. 3 is a fragmentary side elevational view of the structure of FIG. 1 as viewed in the direction of the arrows from line 3—3 therein;

FIG. 4 is an end elevational view of the structure of FIG. 1 as viewed in the direction of the arrows from line 4—4 therein;

FIG. 5 is a transverse sectional view of a portion of the structure of FIG. 1 taken along line 5—5 in FIG. 4;

FIG. 6 is an enlarged fragmentary view of a yarn gripping element as employed in the structure of FIG. 1;

FIG. 7 is a sectional view taken along line 7—7 in FIG. 3 showing the yarn in position at an initial stage in practicing the method;

FIG. 8 is a view similar to FIG. 7 showing the yarn in place at a subsequent stage in the practice of the method;

FIG. 9 is an enlarged schematic illustration useful in explaining a possible theory of operation of the subject device;

FIG. 10 is a view similar to FIG. 9 showing a different phase in the operation of the device; and FIG. 11 is a view of a typical splice formed between two thermoplastic yarns by the device in accordance with the subject invention;

FIG. 12 is a fragmentary top elevated view of the structure of FIG. 1.

The same reference numerals are used throughout the several figures of the drawings to designate the same or similar parts.

Referring to the drawings, there is shown generally at 10 a body in the shape of a rectangular parallelepiped having a cylindrical cavity 11 therethrough. A slot 12 positioned longitudinally of the body 10 communicates radially with the cavity 11, as shown. The upper entrance to the slot 12 is beveled or tapered at 13 to facilitate insertion of the yarns through the slot into the cavity 11.

As best seen in FIGS. 5 and 7, a small diameter bore or orifice 14, located in the rear wall of the body 10 as viewed in FIG. 1, communicates tangentially with the cavity 11 intermediate the ends thereof. As best seen in FIG. 7, the orifice 14 is located halfway between the opposite ends of the cavity 11.

Secured to the rear wall of the body 10 in registration with the orifice 14 is an air valve 15 of conventional construction. Said valve may have a suitable control button or actuator 16 and provision for joining the same through a tubular conduit 17 to an appropriate source of air under pressure, not shown. A suitable gasket or seal 18 may be interposed between the valve 15 and the body 10 to establish a seal therebetween.

A pair of yarn gripping elements 19 and 20 are secured to the sides of the valve housing 15 so as to extend past the ends of the cavity 11, as shown. While the element 20 is mounted flush against the side of the body 10, see FIG. 4, the element 19 is provided with an offset portion 21 such that its operative or free end is spaced normally a predetermined distance, S, see FIG. 7, from the corresponding end of the body 10.

Each of the gripping elements 19 and 20 is provided with an identical yarn receiving slot 22 having an upper V-shaped region 23 merging with a lower notch region 24. As best seen in FIG. 6, the intersection of the V-shaped region 23 with the notch region 24 occurs along the phantom line 25 which represents the centerline or central axis of the cavity 11.

When it is desired to develop a splice between ends of two lengths of thermoplastic yarn, the ends 26 and 27 should be overlapped in side-by-side relationship and inserted through the slot 12 into the cavity 11. The extent of overlap should be sufficient to enable the ends to be inserted into the slots 22 in the respective gripping elements 19 and 20 with the yarn essentially taut between the elements 19 and 20 and projecting from cavity 11 all substantially as shown in FIG. 7. It should be understood that the yarn ends will be locked within the notch 24 in each gripping element.

Thereafter, the gripping element 19 may be deflected by finger pressure and moved along the longitudinal axis of the cavity 11 for the predetermined distance, S, until element 19 engages the end of the block 10 as shown in FIG. 8. This produces a predetermined slack in the yarn ends so that they engage and rest on the wall of the cavity 11 as seen in FIG. 8.

While holding the gripping element 19 against the body 10, the valve actuator 16 may be depressed for a short interval of, for example, 3 to 5 seconds causing the yarn ends to be spun circumferentially around the longitudinal axis of cavity 11. The spinning action is akin to that of a jump rope.

As a conseqence of the spinning action, the yarn ends 26 and 27 are caused to twist with said twist occurring essentially adjacent the ends of the cavity 11 where the yarn ends are secured in the gripping elements 19 and 20 and for a short distance longitudinally inwardly therefrom. There also results, as will be explained more fully hereinafter, a thermal bonding of adjacent yarn fibers, bearing in mind that the yarn is thermoplastic in nature.

After the injection of air by actuating the valve element 16 for the prescribed short interval, the yarn is removed from the elements 19 and 20 and a splice will exist therebetween substantially as shown, by way of example, in FIG. 11. The twisted and thermally joined regions are shown at 28 and 29.

As mentioned above, the yarn ends are actually thermally bonded or heat fused in the regions 28 and 29 where the twisting occurs. While it is impossible to state with absolute certainty the mechanism by which the thermal bonding is achieved, a possible explanation will be advanced. The yarns in question generally consist of plural strands and the strands consist of a plurality of individual fibers or monofilaments. When the ends are placed together they form a bundle shown generally at 30 in FIGS. 9 and 10. Each bundle 30 may consist of a plurality of individual fibers such as 31 and 32. As a result of the introduction of slack as described above with reference to FIG. 8, the yarn ends contact the wall of the cavity 11 as they are swirled and spun circumferentially thereabout by the air jet. As best seen in FIG. 9, only some of the fibers such as 31 and and 32 contact the wall of the cavity 11. The aforesaid contact causes the individual fibers to rotate about their respective axes as well as causing the entire bundle to rotate about its own axis. The rotation of the individual fibers are shown by the arrows within or adjacent the individual fibers while the rotation of the bundle is shown by the arrow 33. The arrow 34 designates the path of the entire bundle around the central axis of the cavity 11 due to the spinning action.

Due to the rotation shown by the arrow 33, different fibers in the bundle contact the wall of cavity 11 and successively become twisted. Fibers which have been previously twisted, upon leaving contact with the wall of cavity 11, untwist. This twisting action causes heating of the fibers due either to interfiber friction or heat of working or both. The twisting and rolling action causes maximum heating effect at the "jump rope" nodes adjacent the yarn securing elements 19 and 20. The fibers in this region are heated sufficiently to become plasticized and adhere to one another.

As the fibers adhere and twist, the yarn between the gripping elements 19 and 20 is effectively shortened. That is, the slack is gradually eliminated as the fibers and strands assume a helical configuration in the high-twist area adjacent the gripping elements.

If the amount of slack is properly chosen, a time will occur when the elimination of slack due to twisting will pull the yarns away from engagement with the wall of the cavity 11 as seen in FIG. 10. It has been found that this functions to interrupt the heating action preventing overheating and consequential fracture of the yarn ends. It is not practical to furnish a mathematical formula for determining the amount of slack to be introduced into the yarn ends because the problem is extremely complex. The amount of slack will vary with changes in the geometry of the cavity 11 and can best be determined empirically. The slack must be sufficient to cause initial engagement between the yarn ends and the wall of the cavity 11 but must not be too great. If too much slack is permitted either the yarn will not spin properly or excessive twist will be developed and concentrate at the nodes since the duration of contact with the wall of the cavity will increase. Furthermore, twist contraction of the yarn can no longer halt the heating process when excessive slack is present.

As may best be seen from FIG. 12, a preferred embodiment of this invention involves location of the slot 12 at an angle relative to the axis of the cylindrical cavity 11 (the location of the cavity is depicted in the drawing in outline by dashed lines.)

For the purpose of providing a guide, a specific example will be described with a tabulation of the results obtained therewith. In particular, a device was constructed having a cylindrical cavity 11 with a length of 1.5 inches (38.1 mm) and a diameter of 21/64 inches (8.3338 mm). Air was introduced into cavity 11 through an orifice 14, having a diameter of approximately ⅛ inch (3.175 mm), from a source of supply having a pressure varying between 80 and 120 psig (5.6246 and 8.437 kg/cm$^2$). Using such device, splices were formed between two-ply 2.25 cotton count polyester staple spun yarn (Fortrel). After making each splice, the tensile force in pounds required to break the splice was ascertained. In the table below there is tabulated the highest, lowest and mean values for splice breaking force under a series of different conditions. In column A, there is tabulated the results obtained by securing the yarn ends between stationary gripping elements with no slack therebetween or at most insufficient slack to permit the yarns to engage the walls of the cavity 11. In column B, there is tabulated the results obtained when the yarns were foreshortened in the device by moving the gripping element 19 through a distance S equal to 1/16 inch (1.5875 mm). In columns C, D and E, similar values are given for value of S equal to, respectively, ⅛ inch (3.175 mm), 3/16 inch (4.7625 mm) and ¼ inch (6.35 mm).

With the selected dimensions and geometry, when S was 1/16 inch (1.5875 mm), the yarns just engaged the wall of the cavity 11. The results in column B show a noticeable improvement over the results tabulated in column A. In columns C and D, the results are significantly better than in column B, while in column E the results have fallen to a level comparable to that shown in column B. The latter establishes the fact mentioned previously that excessive slack will result in an inferior splice.

EXAMPLE

Parameters

Length of cavity, 11 = 1.5 inch (38.1 mm.)
Diam. of cavity, 11 = 21/64 inch (8.3338 mm.)
Air pressure = 120 psig (8.437 kg/cm$^2$)
Diam. orifice, 14 = ⅛ inch (3.1750 mm.)
Time (approx.) = 4 seconds In the table below force is expressed in pounds and dimensions in inches.

|         | A    | B    | C    | D    | E    |
|---------|------|------|------|------|------|
| S       | 0    | 1/16 | 1/8  | 3/16 | 1/4  |
| Highest | 4.0  | 7.0  | 10.0 | 12.5 | 6.0  |
| Lowest  | 0.0  | 1.0  | 5.0  | 5.0  | 1.0  |
| Mean    | 1.77 | 4.64 | 7.26 | 7.72 | 4.0  |

Yarn = 2.25/2 Polyester (Fortrel)

While the slot 12 shown in the illustrated embodiment coincides with the longitudinal axis of the cavity 11, improved rolling action of the yarns within the cavity may be attained by angling the slot relative to the cavity axis.

Having described the presently preferred embodiment of the invention, it should be understood that various changes in detail may be made therein by those skilled in the subject art without departing from the true scope of the invention as defined in the appended claims.

What is claimed is:

1. The method of splicing thermoplastic yarn comprising the steps of placing in side-by-side overlapping relationship the yarn ends which are to be spliced, disposing the overlapping yarn ends within a cylindrical cavity of a splicing device with the yarn secured at opposite ends of said cavity substantially at the longitudinal axis thereof and with sufficient slack within said cavity to insure initially engagement of said yarn therein with the wall of said cavity when said yarn is spun circumferentially around said axis, and circumferentially spinning said yarn within said cavity for a time sufficient to cause, and thereby causing, thermal bonding of adjacent yarn fibers.

2. The method according to claim 1, wherein said yarn is provided with a slack such that the spin induces said spinning yarn to shorten and lose engagement with said cavity wall before excessive heat is generated in said yarn.

3. The method according to claim 2, wherein a jet of gas is introduced tangentially into said cavity intermediate the ends thereof to cause said circumferential spinning of said yarn.

4. The method according to claim 1, wherein a jet of gas is introduced tangentially into said cavity intermediate the ends thereof to cause said circumferential spinning of said yarn.

5. The method according to claim 1, wherein said yarn ends are caused to twist as a result of said circumferential spinning with said twist occurring only adjacent the ends of said cavity where said yarn ends are secured and for a short distance longitudinally inwardly therefrom, and said thermal bonding is confined to said twisted regions.

6. Apparatus for splicing thermoplastic yarn comprising a body with a cylindrical cavity therethrough, means for gripping overlapping yarn ends in side-by-side relation at opposite ends of said cavity substantially at the longitudinal axis thereof, said gripping means being arranged to introduce a predetermined amount of slack in the yarn therebetween and comprising at least at one end of said cavity a gripping element mounted for movement along the longitudinal axis of said cavity for a predetermined distance whereby the yarn ends can be stretched taut initially between said gripping means and said slack introduced by moving said movable gripping element, and means for circumferentially spinning said yarn in the span between said gripping means.

7. Apparatus according to claim 6, wherein said body is provided with a slot communicating radially with said cavity longitudinally thereof, and said means for spinning said yarn comprise means for injecting a jet of gas tangentially into said cavity intermediate the ends thereof.

8. Apparatus according to claim 7, wherein said slot is at an angle relative to the longitudinal axis of said cavity.

* * * * *